(12) United States Patent
Korenwaitz et al.

(10) Patent No.: US 9,519,704 B2
(45) Date of Patent: Dec. 13, 2016

(54) REAL TIME SINGLE-SWEEP DETECTION OF KEY WORDS AND CONTENT ANALYSIS

(75) Inventors: Elyasaf Korenwaitz, Elon-Moreh (IL); Moshe Doron, Petach-Tikva (IL)

(73) Assignee: NetSpark LTD, Petach Tikva (IL)

( * ) Notice: Subject to any disclaimer, the term of this patent is extended or adjusted under 35 U.S.C. 154(b) by 0 days.

(21) Appl. No.: 13/885,164

(22) PCT Filed: May 14, 2012

(86) PCT No.: PCT/IL2012/050171
§ 371 (c)(1),
(2), (4) Date: May 14, 2013

(87) PCT Pub. No.: WO2012/156971
PCT Pub. Date: Nov. 22, 2012

(65) Prior Publication Data
US 2014/0095515 A1    Apr. 3, 2014

Related U.S. Application Data

(60) Provisional application No. 61/487,316, filed on May 18, 2011.

(51) Int. Cl.
*G06F 7/00* (2006.01)
*G06F 17/00* (2006.01)
*G06F 17/30* (2006.01)
*G06F 17/27* (2006.01)

(52) U.S. Cl.
CPC ......... *G06F 17/30699* (2013.01); *G06F 17/27* (2013.01)

(58) Field of Classification Search
CPC .................. G06F 17/30873; G06F 17/30899; G06F 17/30699; G06F 17/3061
See application file for complete search history.

(56) References Cited

U.S. PATENT DOCUMENTS

| | | | |
|---|---|---|---|
| 5,794,246 A * | 8/1998 | Sankaran et al. | |
| 6,230,131 B1 | 5/2001 | Kuhn et al. | |
| 6,980,992 B1 | 12/2005 | Hursey et al. | |
| 7,539,658 B2 | 5/2009 | Perazolo et al. | |
| 7,822,743 B2 | 10/2010 | Henkin et al. | |
| 7,873,635 B2 | 1/2011 | Wang et al. | |
| 2001/0044818 A1 | 11/2001 | Liang | |
| 2002/0107926 A1 | 8/2002 | Lee | |
| 2002/0174147 A1 * | 11/2002 | Wang et al. | 707/513 |
| 2003/0210649 A1 * | 11/2003 | Bondi | 370/229 |
| 2008/0243821 A1 * | 10/2008 | Delli Santi et al. | 707/5 |
| 2009/0132467 A1 * | 5/2009 | Blewett et al. | 707/2 |
| 2009/0313244 A1 * | 12/2009 | Sokolenko et al. | 707/5 |
| 2010/0046842 A1 * | 2/2010 | Conwell | 382/218 |

(Continued)

*Primary Examiner* — Susan Chen
(74) *Attorney, Agent, or Firm* — Steven C. Lessoff

(57) ABSTRACT

A system and method are provided for real-time analysis of text. During a single sweep through the text, a detection tree is used to identify a sequence of characters in the text from a large dictionary of keywords. When a keyword is detected a rule tally database is updated. An intermediate score may be available during the sweep and a final score of the text may be available substantially immediately upon finishing the single sweep. A second text may be analyzed immediately using the same score buffer and rule tally database without updating the rule tally database.

10 Claims, 11 Drawing Sheets

(56) References Cited

U.S. PATENT DOCUMENTS

2010/0121631 A1    5/2010  Bonnet et al.
2011/0313844 A1*  12/2011  Chandramouli ... G06Q 30/0241
                                                  705/14.42

\* cited by examiner

Figure 4a

| keyword | site | rule | incidence | Scan id |
|---|---|---|---|---|
| DIRTYMOVIE | T1 | (T1=1) →-10 | T1=0 | 0 |
| DETERGENT | T2 | (T2=1)&(T3>0)&(T4=0) →+2 | T2=0 | 0 |
| DIRTY | T3 | (I) [(T3=2)→-2]OR<br>(II) [(T3=1)&(T4=0)&(T2=0) →-2 ]OR<br>(III) [(T3=1)&(T5=0)&(T6>0)&(T2=0)→-2] OR<br>(IV) [(T3=1)&(T5>0)&(T2=0) →-2] | T3=0 | 0 |
| DIG | T4 | (T4=1)&(T3>0)&(T2=0) →+2 | T4=0 | 0 |
| DIGTHEM | T5 | (T5=1) →-2 OR<br>(T5=2) →-4 OR<br>[(T5=1)&(T3>0)&(T2=0)&(T6=0) →-2] | T5=0 | 0 |
| DIGTHESE | T6 | (T6=1)&(T3>0)&(T2=0)&(T5=0) →-2 | T6=0 | 0 |
| ROSE | T7 | (T7>0) →-1 | T7=0 | 0 |

300a

| Scan id | 0 |
|---|---|
| score | 0 |

| | Text 1 | id |
|---|---|---|
| # | T1=0 | 0 |
| | T2=0 | 0 |
| | T3=1 | 1 |
| | T4=0 | 0 |
| | T5=0 | 0 |
| | T6=0 | 0 |
| | T7=0 | 0 |

| | Text 2 | id |
|---|---|---|
| # | T1=1 | 3 |
| | T2=4 | 2 |
| | T3=3 | 1 |
| | T4=1 | 8 |
| | T5=3 | 5 |
| | T6=1 | 3 |
| | T7=2 | 4 |

| | Text 3 | id |
|---|---|---|
| # | T1=0 | 0 |
| | T2=0 | 0 |
| | T3=0 | 0 |
| | T4=0 | 0 |
| | T5=0 | 0 |
| | T6=0 | 0 |
| | T7=0 | 0 |

| 652b:1 | |
|---|---|
| R1=0 | 0 |
| R2=3 | 1 |
| R3=0 | 0 |
| R4=0 | 0 |
| R5=0 | 0 |
| R6=0 | 0 |

| 652b:2 | |
|---|---|
| R1=3 | 4 |
| R2=-1 | 8 |
| R3=3 | 5 |
| R4=4 | 0 |
| R5=1 | 2 |
| R6=1 | 3 |

| 652b:3 | |
|---|---|
| R1=0 | 0 |
| R2=0 | 0 |
| R3=0 | 0 |
| R4=0 | 0 |
| R5=0 | 0 |
| R6=0 | 0 |

| 601b:1 | |
|---|---|
| score | -2 |
| id | 1 |

| 601b:2 | |
|---|---|
| score | 4 |
| id | 2 |

| 601b:3 | |
|---|---|
| score | 0 |
| id | 0 |

Figure 6c

| | Text 1 | id |
|---|---|---|
| # | T1=0 | 0 |
| | T2=0 | 0 |
| | T3=1 | 1 |
| | T4=0 | 0 |
| | T5=0 | 0 |
| | T6=1 | 8 |
| | T7=0 | 0 |

| | Text 2 | id |
|---|---|---|
| # | T1=1 | 3 |
| | T2=4 | 2 |
| | T3=3 | 1 |
| | T4=1 | 8 |
| | T5=3 | 5 |
| | T6=1 | 3 |
| | T7=2 | 4 |

| | Text 3 | id |
|---|---|---|
| # | T1=0 | 0 |
| | T2=0 | 0 |
| | T3=0 | 0 |
| | T4=0 | 0 |
| | T5=0 | 0 |
| | T6=0 | 0 |
| | T7=0 | 0 |

| 652c:1 | |
|---|---|
| R1=0 | 0 |
| R2=2 | 1 |
| R3=0 | 0 |
| R4=0 | 0 |
| R5=0 | 0 |
| R6=1 | 1 |

| 652c:2 | |
|---|---|
| R1=1 | 2 |
| R2=3 | 8 |
| R3=1 | 8 |
| R4=4 | 0 |
| R5=1 | 8 |
| R6=1 | 3 |

| 652c:3 | |
|---|---|
| R1=0 | 0 |
| R2=0 | 0 |
| R3=0 | 0 |
| R4=0 | 0 |
| R5=0 | 0 |
| R6=0 | 0 |

| 601c:1 | |
|---|---|
| score | -1 |
| id | 1 |

| 601c:2 | |
|---|---|
| score | -14 |
| id | 8 |

| 601c:3 | |
|---|---|
| score | 0 |
| id | 0 |

| site | CONDITIONS |
|---|---|
| T1 | 1:R1+1, 1:R2+1, 1R3+1 |
| T2 | 1:R1+1, 1:R2+1, 1R3+1 |
| T3 | 1:R1+1, 1:R2+1, 1R3+1 |
| T4 | 1:R1+1 |
| T5 | 1:R2+1, |
| T6 | 1:R3+1 |
| T7 | 1:R4+1 |

792a

| INDEX | RULE |
|---|---|
| R1 | 4→-10 |
| R2 | 4→-2 |
| R3 | 4→+2 |
| R4 | 1→-4 |
|  |  |

| site | CONDITIONS |
|---|---|
| T1 | 1:R0+1 |
| T2 | 1:R0+1 |
| T3 | 1:R0+1 |
| T4 | 1:R1+1 |
| T5 | 1:R2+1 |
| T6 | 1:R3+1 |
| T7 | 1:R4+1 |

793

| INDEX | RULE |
|---|---|
| R0 | 3→(R1+3,R1+3,R1+3) |
|  |  |

792b

| INDEX | RULE |
|---|---|
| R1 | 4→-10 |
| R2 | 4→-2 |
| R3 | 4→+2 |
| R4 | 1→-4 |
|  |  |

REAL TIME SINGLE-SWEEP DETECTION OF KEY WORDS AND CONTENT ANALYSIS

RELATED APPLICATIONS

This patent application is a National Phase of PCT Patent Application No. PCT/IL2012/050171 filed 14 May, 2012 and claims the benefit of priority under 35 USC §119(e) of U.S. Provisional Patent Application Ser. No. 61/487,316 filed 18 May, 2011.

FIELD AND BACKGROUND OF THE INVENTION

Various methods and systems to identify content of a presentation are possible and particularly methods and systems may unobtrusively identify and remove undesired content in real-time while allowing a viewer to receive desired content online.

The Internet represents a very valuable resource containing a large quantity of information and vast opportunities. Nevertheless, the Internet is uncontrolled and can also be a source of undesired content. Many Internet users and providers desire to be protected from undesired content that popularizes pornography, drugs, occultism, sects, gambling games, terrorism, hate, blasphemy, spam, junk mail and the like. In order to allow access to desired content while shielding a user from undesired content, Internet filters have been developed.

Early Internet filters were generally based on the filtering of electronic addresses (Uniform Resource Locators, "URLs"). Software compared a website address with addresses contained in a website database (a black list) and prevented access to websites known to include undesired content. Such a methodology depends on the completeness of the prohibited website database. No one has ever compiled a complete indexed database that would make it possible to determine acceptable websites for any user.

Data-mining technologies have been applied to tackle the task of classifying the Internet and protecting users from undesired content. Identifying undesired content in a presentation can be a challenging task. On the one hand, content analysis needs to be general enough to recognize and remove undesired content that may take a large number of different forms. On the other hand, the filter must be specific enough to differentiate undesired content from various contents that the user may desire. Traditional filtering techniques such as text content analysis and data mining are limited in the current state of the art.

Text content analysis and the related field of text mining are used for automatic classification of presentations based on their textual content. Mining applications work in the background to build a large database of information and classification data. With the exponential growth of the Internet, performing off-line content analysis and blocking all undesired URL addresses in advance has become an unmanageable task even with the best data-mining technology. In addition, URL-based filtering either completely blocks or completely allows a URL and all associated content. Often a single URL may include both valuable information and undesired content. URL-based filtering is not sufficiently specific to allow access to the desired content while blocking the access to the undesired content. Furthermore, off-line techniques cannot classify password protected websites that are not accessible to anonymous web crawling classification applications.

Therefore, there is recent interest in real-time content filtering to keep up with the demands of real-time applications (such as those that deliver web pages over the Internet) that usually have stringent time constraints (a person browsing the Internet may be annoyed by a delay of a few seconds or even a single second when requesting a webpage).

An example of the use of content filtering to classify an unknown text is US published patent application 2002/0,107,926 to Lee (Lee '926). Lee '926 teaches analyzing incoming emails and routing them to a receiver based on their textual content. When a new email comes in, the system extracts keywords from the text ("detects words") and checks the keywords in a decision tree in order to classify the text and route the email. Lee '926 does not disclose how to extract keywords from the text or where and how the results are stored. In the application of Lee '926 (email routing), a delay of a few tens of seconds or even minutes is not critical (the email is a message sent to an anonymous server, there is no particular recipient who requested or is waiting for the email). The decision tree classification scheme of Lee '926 is useful for a limited population of texts (for example, an email pertaining to one of a few known possible matters). The decision tree classification scheme of Lee '926 is not configured to analyze complex logical rules.

Decision trees may be used for more complicated classification schemes calling up one or a few rules for actions. For example U.S. Pat. No. 7,539,658 to Perazolo et al. (Perazolo '658) uses a decision tree to classify an event and choose a set of action rules. To work efficiently, the system of Perazolo '658 must limit either the number of rules or the number of attributes tested because there is a trade-off in efficiency between the number of rules to be evaluated and the number of keywords to be considered.

To reliably classify text, content analysis needs to be very flexible. This requires sensitivity to a large number of keywords (tokens) and a large rules base to classify the text on the basis of various nuances in use of the keywords and their number. Therefore, Perazolo '658, which cannot efficiently evaluate a large number of keywords and rules simultaneously, is not suitable for real-time content analysis of unfiltered text.

According to the teachings of both Perazolo '658 and Lee '926, the input to the decision trees is a plurality of attributes (keywords, tokens). The tokens are assumed to be all known and available at the beginning of the process. Thus, both Lee '926 and Perazolo '658, implicitly require detection of tokens by known prior art methods. These prior art methods often include comparing an extracted string to a dictionary of keywords. When the keyword dictionary is large, the search becomes time-consuming, even for a relatively small text.

An alternative prior art method for extracting keywords from a text for further content analysis is to convert the text into a suffix tree. Converting a large text into a tree and then quantifying a large set of phrases in the tree requires significant memory and time. For example, U.S. Pat. No. 7,822,743 to Henkin et al. (Henkin '743) teaches both on- and off-line content analysis. In the off-line mode, without strict time constraints, Henkin '743 teaches use of suffix tree analysis, but for online applications (where time and memory limitations may be significant) Henkin '743 relies on a more limited grammar-based analysis.

Thus, prior art content analysis and keyword extraction technology such as linear dictionaries, suffix trees, or the technology of Henkin '743, Perazolo '658 and Lee '926 are not suited to reliably differentiate between desired and undesired content on-line without obtrusive delays and within reasonable constraints of memory and processing power. Thus, there is needed a super fast, efficient content analysis system for real-time classification of desired and undesired on-line content.

Recently in the field of virus detection U.S. Pat. No. 6,980,992 to Hursey et al. (Hursey '992) disclosed a method for combining virus signatures into a tree structure for real-time detection of virus strings. The detection tree approach of Hursey '992 is particularly suited to virus detection wherein a virus can be positively identified by the detection of a single long string which will almost never occur except in the virus. Therefore, detection of a single particular string is sufficient to identify the presence of a virus. The methodology of Hursey '992 is not sufficient for textual content analysis, because understanding the underlying content of a presentation requires analysis of context and not merely identification of a single predetermined pattern. Particularly, text strings (called keywords) are often short and a given keyword may occur in texts having different contents. Therefore, to identify content it is often important to know the incidence of a large number of different keywords. This means tracking the number of times each particular keyword occurs and judging the relationship of associated keywords in the text.

Thus, none of the above cited prior art is suited for detecting keywords in a text and performing content analysis on the text in real-time. Therefore, it is desirable to have an unobtrusive filter that can reliably analyze content in real-time. The filter should evaluate a large number of keywords and rules in a short period of time for real-time application.

SUMMARY OF THE INVENTION

Various methods and systems to identify content of a presentation are possible and particularly methods and systems may unobtrusively identify and remove undesired content in real-time while allowing a viewer to receive desired content on-line.

An embodiment of a method for content analysis of a text depending on a presence of a plurality of keywords in the text may include providing an incidence database. The incidence database may include at least a first counter and a second counter. The first counter may indicate an incidence of a first keyword of the plurality of keywords, and the second counter may indicate an incidence of a second keyword of the plurality of keywords. The method may also include supplying a detection tree including a plurality of branches and a plurality of sites. Each site may be associated with a keyword of the plurality of keywords. A first site of the plurality of sites may be associated with the first keyword and a second site of the plurality of sites may be associated with the second keyword. The method may further include reading at least one character from the text and selecting, from the plurality of branches, a current branch matching the at least one character that was read. At least one more character may be read from the text, and a sub-branch of the current branch may be selecting. The sub-branch of the current branch may match the at least one more character. The first counter may be incremented when the first site is reached on the sub-branch. Upon incrementing the first counter, a score may be updated depending on a condition. The condition may include a limitation on the value of the first counter and also a limitation on the value of the second counter.

In an embodiment of a method for content analysis, the limitation on the value of the second counter may include the stipulation that the second counter is less than a threshold value and the threshold value may be one.

An embodiment of a method for content analysis of a text may further include analyzing another text subsequent to the analysis of the text without resetting the incidence database.

In an embodiment of a method for content analysis, the selecting of a current branch may include looking up a combination of at least two consecutive characters from the text in a lookup table.

In an embodiment of a method for content analysis, the reading of at least one character may start at a start character. The method may further include designating a new start character in the text and reading at least one new character from the text starting at the new start character. A new branch may be selected from the plurality of branches, the new branch may match the at least one new character. The selecting of the new branch may be subsequent to the updating of the score and subsequent to designating the new start character.

In an embodiment of a method for content analysis, each character of the text may be designated as a start character at most once so that the entire analysis is accomplished in a single sweep.

An embodiment of a method for content analysis of a text may further include supplying a rule tally. A value of the rule tally may depend on the first counter value and on the second counter value. The condition for updating the score may be expressed as a limitation on the value of the rule tally.

In an embodiment of a method for content analysis, the rule tally may be associated with a tally identifier and the method may further include reinitializing the rule tally upon reaching the first site when the tally identifier is not equal to a current scan identifier. The method may further include setting the tally identifier to a current scan identifier value subsequent to the reinitializing.

In an embodiment of a method for content analysis, the rule tally may further depend on a value of another rule tally.

An embodiment of a method for content analysis of a text may further include reading at least one even more character from the text, and selecting a sub-branch of the first site. The sub-branch of the first site may match the at least one even more character. The selecting may be subsequent to the updating of the score.

An embodiment of a method for content analysis of a text may further include analyzing a second text simultaneously to the analysis of the text.

In an embodiment of a method for content analysis, the keyword database may also include a first identifier value associated with the first counter, and the method may further include reinitializing the first counter upon reaching the first site when the first identifier value is not equal to a current scan identifier value. Subsequent to reinitializing the first counter, the first identifier value may be set to the current scan identifier value.

An embodiment of a system for content analysis of a text depending on the presence of a plurality of keywords in the text, may include an incidence database including a first counter configured for indicating an incidence of a first keyword of the plurality of keywords and a second counter for indicating an incidence of a second keyword of the plurality of keywords. The system may also include a detection tree including a plurality of branches. Each branch of the plurality of branches may match a string of characters. The detection tree may also include a plurality of sites, each site associated with a keyword of the plurality of keywords. The plurality of sites may include a first site associated with the first keyword. The detection tree may be configured for navigating to reach the first site upon reading the first keyword in the text and the first counter may be configured for incrementing upon the reaching of the first site. The system may also include a score buffer configured to be updated upon the incrementing of the first counter, the updating being dependent on a condition. The condition may include a limitation on the value of the first counter and the condition may also include a limitation on the value of the second counter.

An embodiment of a system for content analysis of a text may further include a first identifier value configured for indicating when the first counter was incremented during a current scan.

In an embodiment of a system for content analysis of a text the score buffer may be configured for updating upon reaching of the first site only when the second counter value is less than a threshold value, and the threshold value may be one.

An embodiment of a system for content analysis of a text may further include a second score buffer. The detection tree, the score buffer and the second score buffer may be configured for simultaneously analyzing at least two texts.

An embodiment of a system for content analysis of a text may further include a lookup table configured for looking up at least two letters of the text simultaneously and selecting the current branch.

An embodiment of a system for content analysis of a text may further include a sub-branch of the first site.

An embodiment of a system for content analysis of a text may further include a rule tally. A value of the rule tally may depend on the first counter value and on the second counter value. The condition for updating the score may be expressed as a limitation on the value of the rule tally.

An embodiment of a system for content analysis of a text may further include a tally identifier. The tally identifier may be configured for indicating when the rule tally was updated during a current scan.

In an embodiment of a system for content analysis of a text, the score buffer may be configured for updating when the current branch reaches the second site and when the rule tally attains a threshold value.

An embodiment of a system for content analysis of a text may further include an intermediate rule and the rule tally value may further depend on the intermediate rule.

TERMINOLOGY

The following terms are used in this application in accordance with their plain meaning, which is understood to be known to those of skill in the pertinent art(s). However, for the sake of further clarification in view of the subject matter of this application, the following explanations, elaborations and exemplifications are given as to how the term may be used or applied herein. It is to be understood that the below explanations, elaborations and exemplifications are to be taken as exemplary or representative and are not to be taken as exclusive or limiting. Rather, the terms discussed below are to be construed as broadly as possible, consistent with its ordinary meanings and the below discussion.

A keyword is a distinctive predefined string of characters or token used to classify a presentation; a keyword is not necessarily a complete word; a keyword may not be independently meaningful; and a keyword may include symbols, digits, punctuation, multiple words, acronyms, or abbreviations.

The word incidence is used in the current application in a wide sense of any quantitative measure of the occurrence of a keyword in an analyzed portion of a text. Thus, for example, a score is dependent on the incidence of a keyword if the score is changed based on the presence of the keyword, the absence of the keyword, the presence of a particular number of occurrences of the keyword, or a statistical condition involving the keyword (e.g. the keyword represents at least a certain percentage of the words in the text, the keyword occurs more than another keyword, the keyword occurs at least twice as much as another keyword).

A presentation is a structure containing content formatted for displaying to a user. The displaying may be via sound (for example, for playing over a loudspeaker) or via light (for example, for displaying on a computer monitor). Common examples of presentations are a webpage (e.g., in HTML format), a PowerPoint© presentation, a Portable Document Format (PDF) file, and a Microsoft© Word file.

Real-time means waiting time of a human user. Thus, opening a webpage requested by a human user is a real-time operation, because from the time that the user requests the webpage (e.g., by clicking a link) until the time that the webpage is displayed on the screen, the user may be waiting for the webpage to appear.

A single-sweep content analysis system is a system which scans once across a text (testing a particular character only once to determine if the character starts any string) and performs content analysis on a text. Scanning and analysis may be performed simultaneously such that at the end of the scanning, part of the analysis has been completed.

BRIEF DESCRIPTION OF THE DRAWINGS

Various embodiments of a system and method for real-time content analysis are herein described, by way of example only, with reference to the accompanying drawings, where:

FIG. 4a is an illustration of an incidence database and score buffer in a zero state;

FIG. 6b is an illustration of a rule database and an incidence database for the second embodiment of a real-time text analysis system while analyzing a first and second text;

FIG. 6c is an illustration of a rule database and an incidence database for the second embodiment of a real-time text analysis system after analyzing a first and second text;

FIG. 7a is an illustration of a few compound rules, and

FIG. 7b is an illustration of a string of rules performing the same function as the compound rules of FIG. 7a.

DESCRIPTION OF THE PREFERRED EMBODIMENTS

The principles and operation of a system and method for real-time content analysis according to various embodiments may be better understood with reference to the drawings and the accompanying description.

Figure 1:
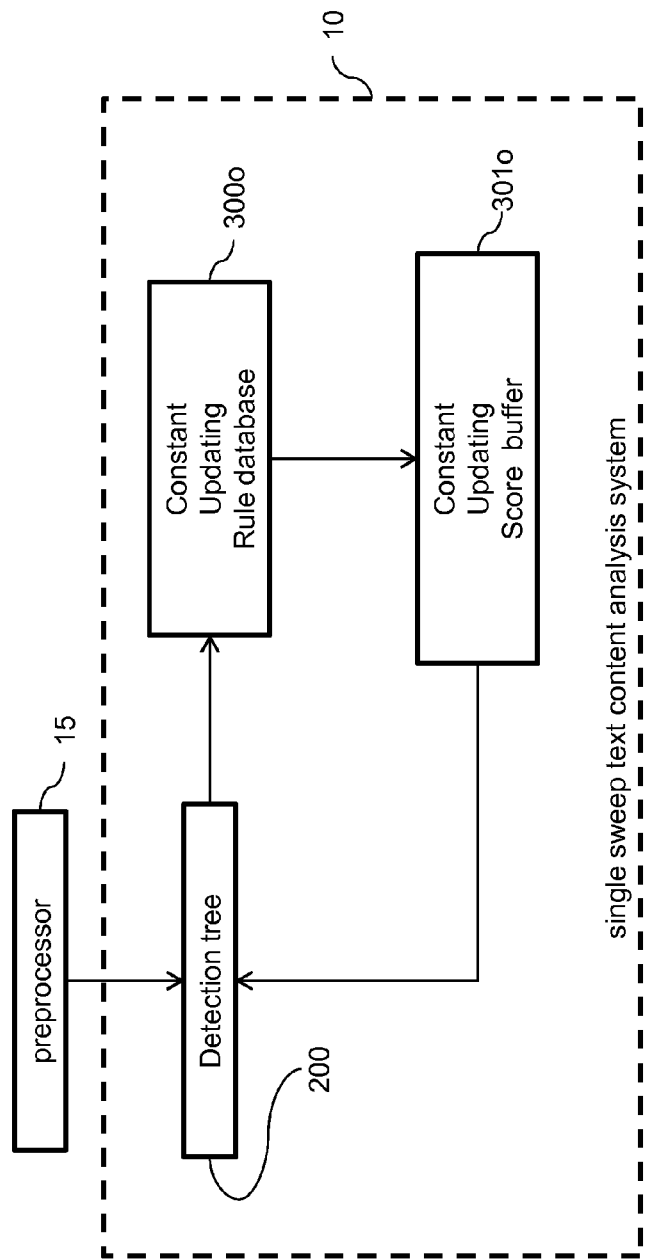
FIG. 1 is a high level box diagram overview of a system for real-time content analysis.

FIG. 1 is a high level box diagram of a single-sweep text content analysis system 10. A preprocessor 15 prepares text for system 10. System 10 includes a detection tree 200, an incidence database 300o, and a score buffer 301o.

Preprocessor 15 eliminates or replaces unnecessary and non-standard characters in a textual input and outputs a clean text to detection tree 200. Detection tree 200 detects each occurrence of any one of a large number of keywords in the text. The configuration of detection tree 200 makes detection nearly independent of the number of potential keywords in the dictionary. Therefore, single-sweep text content analysis system 10 can quickly detect incidences in a text of any keywords from a vast dictionary of keywords.

As will be described in detail herein below, when one of the keywords is detected in the text, incidence database 300o is updated and score in score buffer 301o may also be updated depending on the previous incidence of one or more keywords.

Conventional scoring databases are not constantly updated. In conventional databases, after scanning a text, the entire database must be checked, scored and reset. When there are a very large number of rules, such conventional databases take a long time to operate. The constant updating feature of incidence database 300o and score buffer 301o allows a score to be constantly updated during the scanning of the text so that at the end of the scanning, the score is immediately available and a new text can immediately be scanned without need to reset database 300o. Thus, the speed of the scanning process is substantially independent of the number of rules or the number of keywords in incidence database 300o.

Thus, even for a very large dictionary of keywords and a large number of rules, the system of FIG. 1 very quickly scans the text, detects occurrences of the keywords, computes a score and is immediately ready to scan a new text. Thus, system 10 has the ability to reliably identify content (based on a large number of rules and keywords) within the time constraints of real-time Internet access.

Figure 2A:
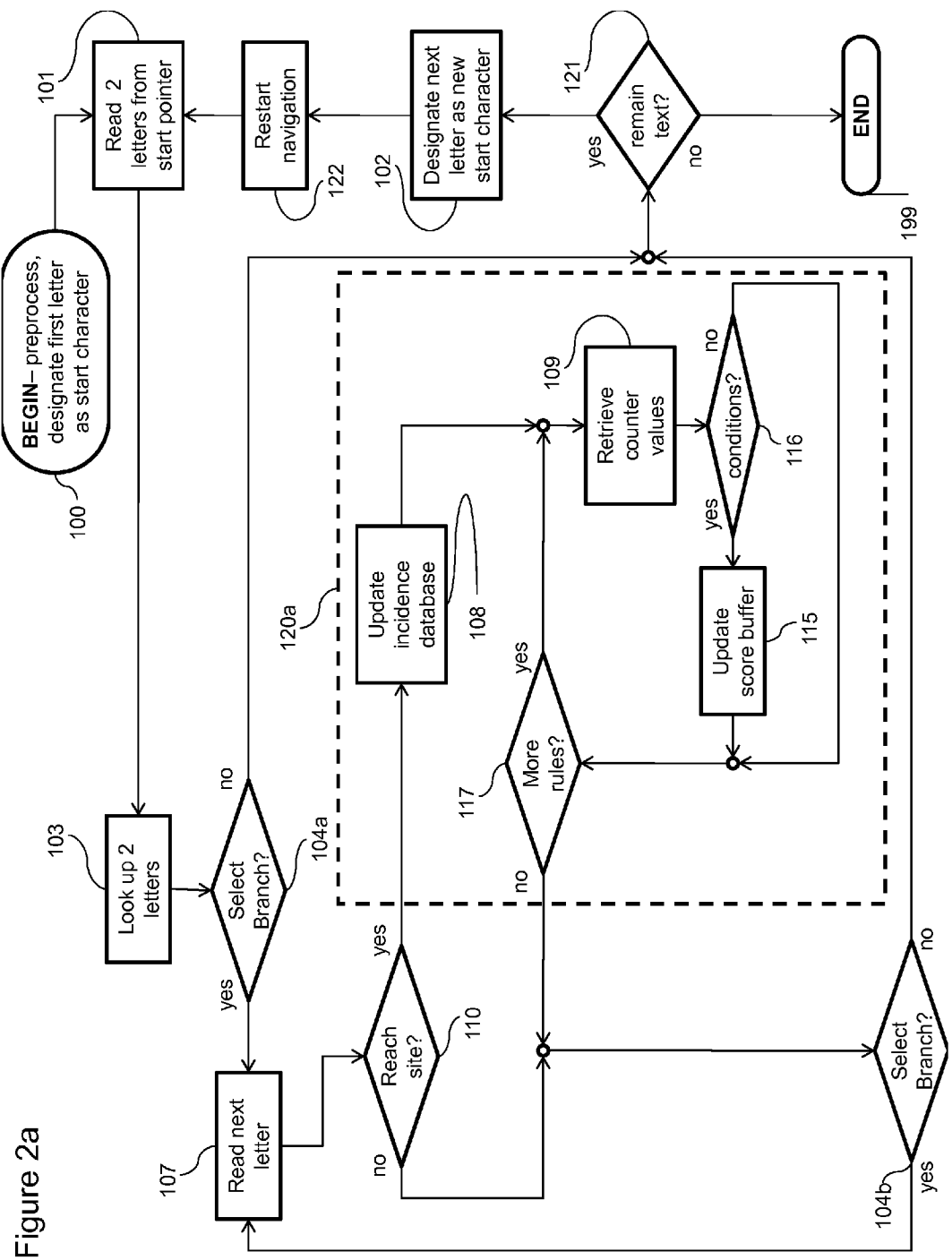
FIG. 2a is a flow chart illustration of a method for real-time content analysis.
Figure 3:
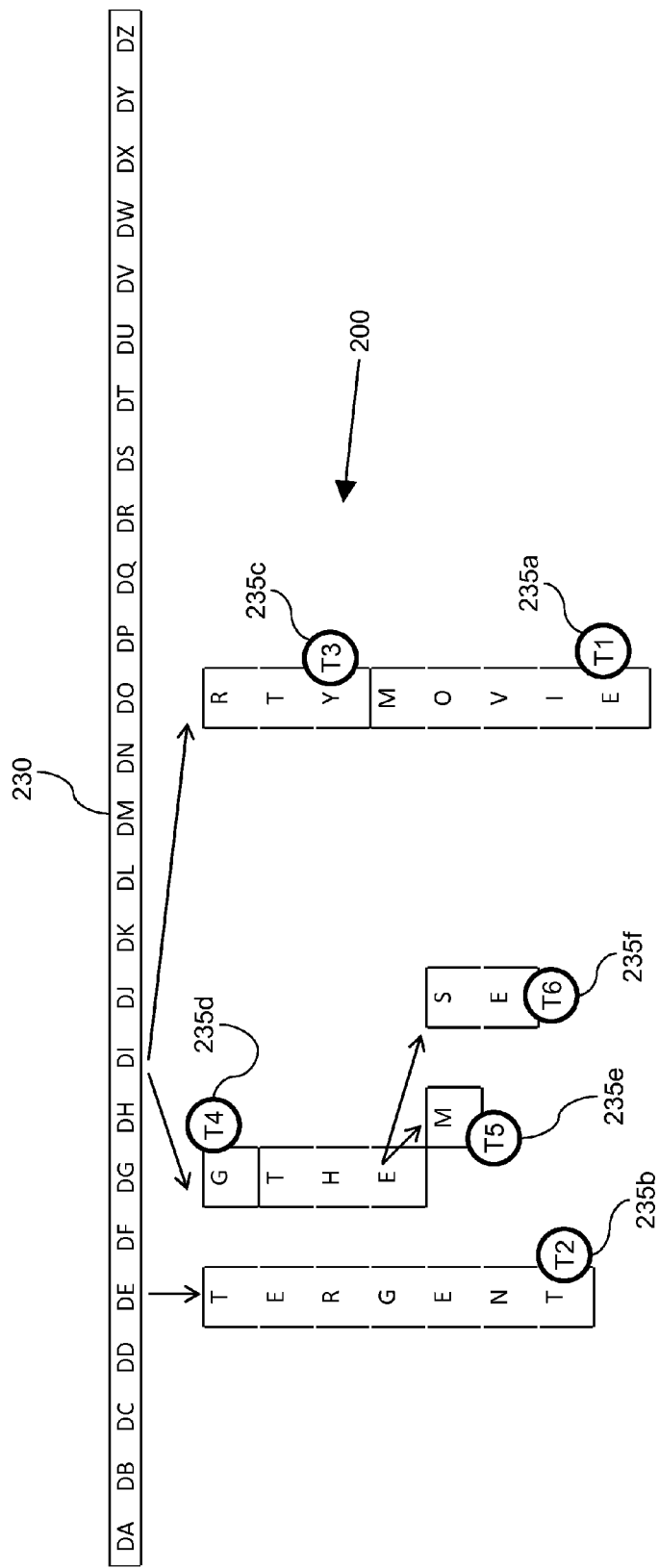
FIG. 3 is an illustration of a detection tree.

FIG. 2a is flow chart of an embodiment of a method of real-time single-sweep context analysis. A simplified detection tree 200 is shown in detail in FIG. 3. Detection tree 200 is employed with an incidence database 300a and a score buffer 301a (see FIG. 4a).

Detection tree 200 includes a lookup table 230 of the $26^2$ possible two-letter combinations of the English alphabet. For very large detection trees, often all possible two- or three-letter combinations will be associated with at least one branch. In such a case, it is often more efficient to start by reading two or three letters and look up the combination in a lookup table with, for example, $26^2$ or $26^3$ entries rather than reading and looking up each of the first two or three letters serially. Similarly, for later stages of the table where there are a large number of sub-branches, a lookup table may be used to speed up performance.

Detection tree 200 begins with two branches (starting with the letters "DE" and "DI") and ends with four sub-branches. Detection tree 200 also includes six sites 235a, 235b, 235c, 235d, 235e and 235f, corresponding to the keywords "DIRTYMOVIE", "DETERGENT", "DIRTY", "DIG", "DIGTHEM", and "DIGTHESE" respectively. The details of the rules and associated keywords (T1 to T6 respectively) associated with each site 235a-f are shown in incidence database 300a of FIG. 4a. Site 235c has sub-branch leading to site 235a, and site 235d has two sub-branches ending in sites 235e and 235f.

The steps of the embodied method can be understood through illustration of analysis of two simple texts, "The dirty boy was digging in the rose-garden," and "Dig these dirty scenes from our latest dirty movie." The first text is preprocessed 100 (e.g., removing non-letter characters like spaces and hyphens and converting all letters to capitals resulting in the text "THEDIRTYBOYWASDIG-GINGINTHEROSEGARDEN") and the first letter of the text, "T" is designated as the start character. Then detection tree 200 is navigated according to the text starting at the start character. Particularly, a two-letter combination "TH" is read 101 and looked up 103 in a look up table 230. The combination "TH" is not associated 104a with a further branch of tree 200 and there remains 121 more text. Therefore the next letter "H" is designated 102 as the new start character, and the process restarts 122 by reading 101 a new combination "HE". The combination "HE" is looked up 103 and found not to be associated 104a with a further branch. The same process occurs for combination "ED" until the combination "DI" is read 101.

There is a branch associated 104a with the combination "DI". Therefore the branch leading to site 235c is selected as the current branch and the next letter "R" is read 107. The resulting letter sequence "DIR" does not correspond to a keyword, and therefore, no site has been reached 110. Nevertheless, the string "DIR" is associated 104b with the current branch. Therefore the next letter "T" is read 107 giving the combination "DIRT" which is not yet a keyword; therefore no site has been reached 110. Nevertheless the string "DIRT" is associated 104b with the current branch. Therefore the next letter "Y" is read 107.

The keyword "DIRTY", T3, has been encountered, and the corresponding site 235c has been reached 110. Therefore, incidence database 300a and score buffer 301a are updated 120a.

Figure 2B:
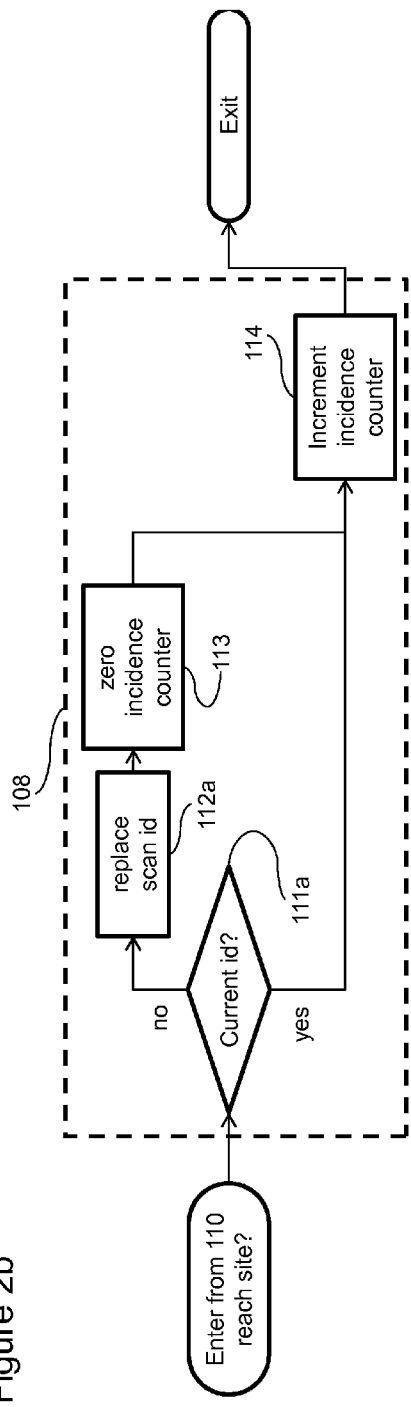
FIG. 2b is a flow chart illustration of a method of updating an incidence database.

FIG. 2b is a flow chart illustrating an embodiment of updating 108 incidence database 300a. For the sake of the current illustration the current scan id is "1" and incidence database 300a starts in a zero state (as shown in FIG. 4a, all incidence counters and all previous encounter identifiers [id's] are zero).

Figure 4D:
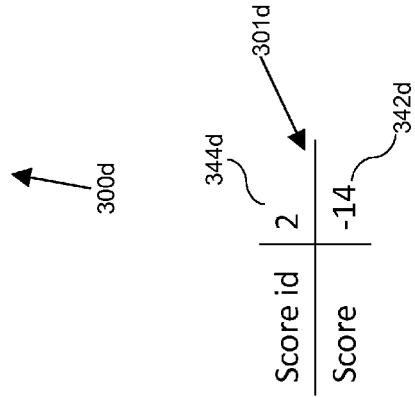
FIG. 4d is an illustration of an incidence database and score buffer after analyzing a first and a second text.
Figure 4C:
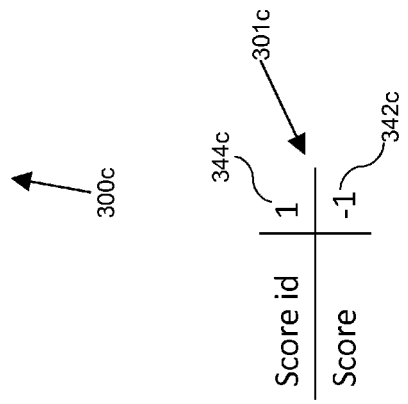
FIG. 4c is an illustration of an incidence database and score buffer after analyzing a first text.
Figure 4B:
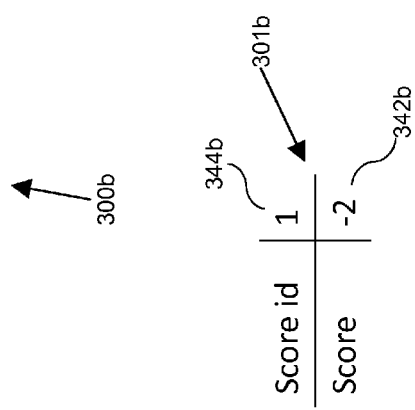
FIG. 4b is an illustration of an incidence database and score buffer after processing a single rule.

When string "DIRTY" is encountered, the previous encounter identifier of keyword T3 is checked 111a. Since this is the first time that the keyword "DIRTY" has been found in this scan, then the previous encounter identifier is not equal to the current scan id (the previous encounter id in the row of keyword T3 is "0" and the current scan id is "1"). Therefore the previous encounter identifier of keyword T3 is replaced 112a with the current scan id "1" and the incidence counter of keyword T3 is reinitialized to zero 113 and then incremented 114 to "1". The updated incidence database 300b is shown in FIG. 4b. After updating 108 incidence database 300b the process goes on to check the conditions of the rules associated with keyword T3.

For the sake of the current illustration the current scan id is "1" and score buffer 301a starts in a zero state (as shown in score buffer 301a of FIG. 4a the score, and the score identifier [score id] are both zero). In the case of the current illustration, four rules are associated with keyword T3.

I. The first rule is represented symbolically (T3=2)→>−2, which means that the action, subtract two from the score (→>−2), is dependent on the condition (T3=2), including the limitation that incidence counter value of keyword T3 is two. Thus, when the incidence counter of keyword T3 in the current scan attains two, then two is subtracted from the score.

II. The second rule is represented symbolically (T3=1)&(T4=0)&(T2=0)→>−2, which means that the action, subtract two from the score (→−2), is dependent on the condition (T3=1)&(T4=0)&(T2=0), including limitations on three incidence counters: the incidence counter of keyword T3 is equal to one, (this is the first encounter of the keyword in the current scan, T3=1) and the incidence counter of the keyword T4 is zero (the keyword T4 has not been found in the current scan, T4=0) and the keyword T2 has not been found in the current scan (incidence counter T2=0). If all of the limitations are true, then two is subtracted from the score (→−2).

III. The third rule is represented symbolically as (T3=1)&(T5=0)&(T6>0)&(T2=0)→>−2, which means that if this is the first identification of the keyword T3 in the current scan (incidence counter T3=1) and the keyword T5 has not been found in the current scan (incidence counter T5=0) and the keyword T6 has been found in the current scan (incidence counter is greater than the threshold value, zero, T6>0) and the keyword T2 has not been found in the current scan (incidence counter T2=0) then subtract two from the score (→−2).

IV. The fourth rule is represented symbolically (T3=1)&(T5>0)&(T2=0)→>−2 which means if this is the first identification of the keyword T3 in the current scan (T3=1) and the keyword T5 has been found in the current scan (T5>0) and the keyword T2 has not been found in the current scan (T2=0) then subtract two from the score (→−2). Note that the limitation that the keyword T2 has not been found (T2=0) can also be expressed (T2<1) as the limitation that the counter of T2 is less than the threshold value "1".

Thus each rule is conditional on limitations on one or more incidence counters (each limitation is represented by a parenthetical expression) of one or more keywords.

At this point T3=1 and no other keywords have been found in this scan. (T1=0, T2=0, T4=0, T5=0, T6=0). The condition the first rule (I) that (T3=2) is checked and found 116a false since the value of the incidence counter of T3 is "1" and not "2".

Figure 2C:
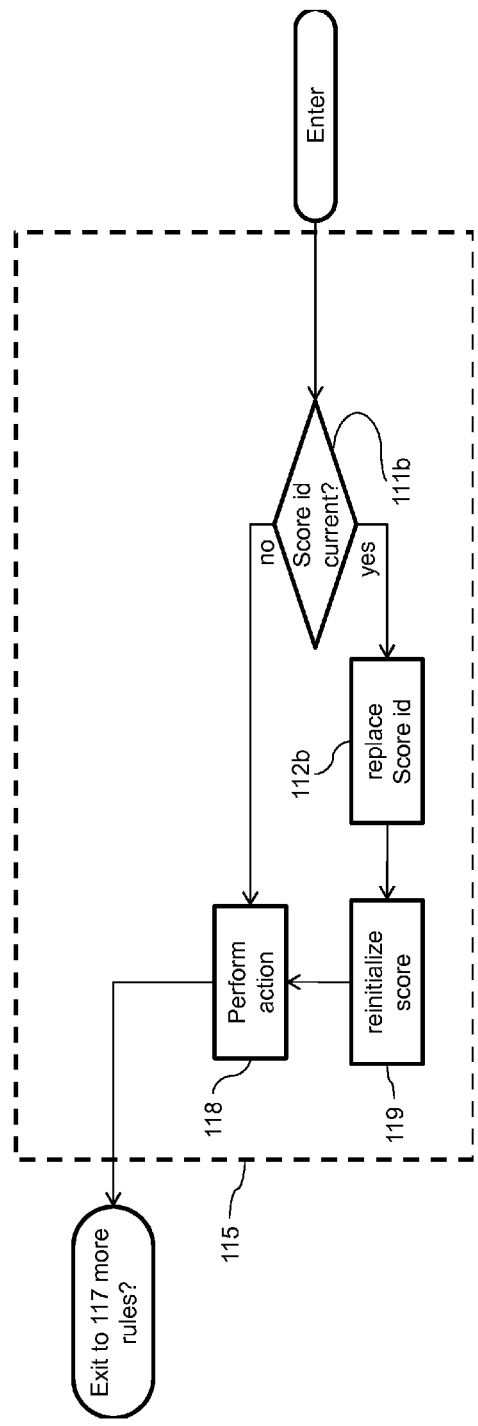
FIG. 2c is a flow chart illustration of a method of updating a score buffer.

There remain 117 more rules. To check the condition of the second rule (II) (T3=1)&(T4=0)&(T2=0) the values of the incidence counters of T4 and T2 are retrieved 109 from keyword incidence database 300a and found to both be zero. Therefore the condition is found 116a to be true. Consequently, score buffer 301a is updated 115 as illustrated in FIG. 2c. A score id 344a is checked 111b against the current scan id. Score id 344a is not equal to the current scan id (0≠1). Therefore, score id 344a is replaced 112b with the current scan id and a score 342a is reinitialized 119 to zero. Then the score is modified 118 by performing the action of rule (II). Particularly, two is subtracted from score 342a to get −2. The state of score buffer 301b after updating is shown in FIG. 4b; score id 344b is 1 and score 342b is −2.

To check the conditions of the rules (III) and (IV) of keyword T3 the values of T5 and T6 are retrieved 109 from incidence database 300a. The values T5=0 and T6=0 are checked against the conditions, which are found 116 false. When all of the rules associated with the keyword T3 have been processed, the process returns to the next step in FIG. 2a and checks and finds that the site 235c is associated 104b with a further sub-branch leading to site 235a (see FIG. 3). Therefore the next letter "B" is read 107 resulting in string "DIRTYB". No site has been reached 110 and the current string is not associated 104b with any further branch and there remains 121 more text. Therefore, the next letter "I" is designated 102 as the new start character, and navigating detection tree 200 is restarted 122 by reading 101 two more letters "IR" from the current location of the start pointer.

The process continues according to the above description until the combination "DI" is read 101 and subsequently the letter "G" is read 107 and the keyword "DIG" is detected and site 235d has been reached 110. Site 235d and keyword T4 are associated with the condition and action (T4=1)&(T3>0)&(T2=0)→>+2. Therefore, score buffer 301b and incidence database 300b are updated 120a. Particularly, incidence database 300b is updated 108 by replacing 112a the previous encounter identifier of keyword T4 with "1" and reinitializing to zero 113 the incidence counter of keyword T4 and then incrementing 114 the counter to "1".

Then the condition of the rule associated with keyword T4 is checked. Symbolically the condition is (T4=1)&(T3>0)&(T2=0). To check the condition the incidence counters of T3 and T2 are retrieved 109 from keyword incidence database 300b and compared to the condition, which found 116 to be true. Therefore, score buffer 301b is updated 115. Specifically, score id 344b is checked 111b and found equal to the current scan id "1". Therefore, the score is modified 118 by performing the action of the rule associated with keyword T4. Particularly, 2 is added to score 342b. Thus, the updated score 342c is now "0".

Scanning the rest of the first text finds the keyword "ROSE" (T7) [not shown in detection tree 200]. The condition T7=1 is found 116 true, and the current score id "1" is equal to the current scan id. Therefore, (in addition to the two that was already added to score 342b, another) one is subtracted from score 342b. After reading the keyword "ROSE", no more keywords are found and the process ends 199. The state of incidence database 300c score buffer 301c at the end of scanning the first text are shown in FIG. 4c. The final score 342c of the first text is "−1".

It is emphasized that at no point was it necessary to search or reset the entire incidence database 300a. Each letter of the text was designated 102 as a start character (searching for a keyword starting with that character) at most once.

After scanning the first text, the second text is scanned without resetting incidence database 300c. This ability to compute a score without requiring evaluation of the entire incidence database 300a and to start a new scan without resetting the incidence database 300a means that the methodology of FIG. 2a-c allows efficient text scanning even with a large number of rules. Thus the combination of use of detection tree 200 for identifying keywords in the text and constantly updating incidence database 300a and constantly updating score buffer 301a allows for reliable fast (real-time) context analysis using a large dictionary of keywords (even a million or more) and a large incidence database (even a million or more rules).

It should be noted, that an intermediate score of a text is available at any time during the scanning process and the final score is available substantially immediately at the end of the single sweep through the first text.

At the beginning of scanning of the second text "Dig these dirty scenes from our latest dirty movie," incidence database 300c and score buffer 301c remain unchanged from the end of the first scan (as illustrated in FIG. 4c) without need to be reset. The scan id for the second text is "2".

Alternatively, the score buffer could be reinitialized whenever a new text is read eliminating the need for score id 344*a*-*d* and checking 111*b* thereof.

The second text is preprocessed 100 to "DIGTHESEDIRTYSCENESFROMOURLATESTDIRTYMOVIE" and the first letter "D" is designated as the start character. The first two letters "DI" from the second text are read 101. There is a further branch associated 104*a* with the combination "DI". Therefore the next letter "G" is read 107, and site 235*d* associated the keyword "DIG" has been reached 110. Checking 111*a* the previous encounter identifier of keyword T4 in incidence database 300*c*, the previous encounter identifier of keyword T4, "1", is not equal to the current scan id, "2". Therefore, the previous encounter identifier of T4 is replaced 112*a* with the current scan id "2" and the incidence counter in T3 is reinitialized to zero 113 and incremented 114 to "1".

At this point T4=1 and no other keywords have been found in the second scan. Even though the incidence counter of T3 is one in incidence database 300*c*, nevertheless the incidence counter value of the keyword T3 retrieved from keyword incidence database 300*c* is zero because the scan id, "1", of T3 is not equal to the current scan id, "2". Thus, the condition of T4, (T4=1)&(T3>0)&(T2=0)→+1 is found 116 false. There remain 117 no more unprocessed rules for the keyword T4.

The process returns to the next step in FIG. 2*a* and checks and finds that the string "DIG" (and consequently site 235*d*) is associated 104*b* with two further sub-branches. Therefore the process continues to read 107 the next letters "T" and "H", which are both associated 104*b* with the current branch. Then the letter "E" is read 107. The string "DIGTHE" is associated 104*b* with the sub-branch leading to site 235*f*; therefore the sub-branch is selected and letters "S" and "E" are read 107. Both associated 104*b* with the sub-branch, and site 235*f* is reached 110. Thus, keyword T6, "DIGTHESE," has been detected. Therefore, incidence database 300*c* is updated 108. Checking 111*a* the previous encounter identifier of T6 in incidence database 300*c*, the scan id "0" is not equal to the current scan id "2". Therefore, the previous encounter id of T6 is replaced 112*a* with the current scan id "2" and the incidence counter of keyword T6 is reinitialized to zero 113 and then incremented 114 to "1".

The conditions of the rule associated with keyword T6 are checked and found 116 false. Since no more rules remain 117, the process checks and finds that the string "DIGTHESE" is not associated 104*b* with a further branch and there remains 121 more text. Therefore and the next letter "I" is designated 102 as the new start character, and the process restarts 122 by reading 101 the next two letters "IG" from the location of the start pointer.

The process continues sweeping once through the second text detecting the keywords, "DIRTY", "DIRTY", "DIRTYMOVIE".

According to principles already explained hereinabove, on the first encounter of "DIRTY", detection tree 200 is navigated to reach 110 site 235*c*, incidence database 300*c* is updated 108 by replacing 112*a* the previous encounter identifier of T3 with "2" and reinitializing to zero 113 the incidence counter of T3 and then incrementing 114 the counter to "1". Also according to principles explained hereinabove the condition of the third rule associated with keyword T3 [(III) (T3=1)&(T5=0)&(T6>0)&(T2=0)→−2] is found 116 true. Therefore, score buffer 301*c* is updated 115. Because score id 344*c* is "1" and not equal to the current scan id "2", score id 344*c* is replaced with "2" and score 342*c* is reinitialized 119 to zero and then the score is modified 118 by performing the action of T3 (rule (III)) subtracting two from score 342*c*).

According to principles already explained hereinabove, after reading 107 the letter "S" and restarting 122, detection tree 200 is navigated without finding a keyword until it again reaches 110 site 235*c* detecting the second occurrence of the keyword "DIRTY", incidence database 300*c* is updated 108. Particularly since the previous encounter identifier of T3, is now equal to the current scan id "2", therefore, the incidence counter of keyword T3 is incremented 114 to "2". According to principles explained hereinabove the conditions of the first rule (I) associated with keyword T3 (T3=2) is found 116 true and score buffer 301*c* is updated 115 by subtracting two from the score according to rule (I) (T3=2)→−2.

According to principles already explained hereinabove, navigating continues along the sub-branch of site 235*c* eventually reaching 110 site 235*a* when the keyword "DIRTYMOVIE" in encountered. Incidence database 300*c* is updated 108 by replacing 112*a* the previous encounter identifier of T1 with "2" and reinitializing to zero 113 the incidence counter and then incrementing 114 the counter to "1" for T1. Also according to principles explained hereinabove score buffer 301*c* is updated 115 by subtracting ten from the score according to the rule associated with keyword T1 (T1=1)→>−10.

Thus, by means of a single sweep through the second text and without resetting the entire incidence database 301*c*, the score of the second text is determined to be −14. The final resulting incidence database 300*d* and score buffer 301*d* after scanning the second text is shown in FIG. 4*d*.

It will be understood by one skilled in the art that resetting a large incidence database may take a significant quantity of time. Thus, incidence database 300*a* which does not need to be reset can makes it possible to search for a large number keywords in real time.

In alternative embodiments, a second score buffer and second incidence database are supplied. In such an embodiment, decision tree 200 can be used to analyze two texts simultaneously, the score and incidence data for each text being stored in its individual score buffer and incidence database.

Figure 5A:
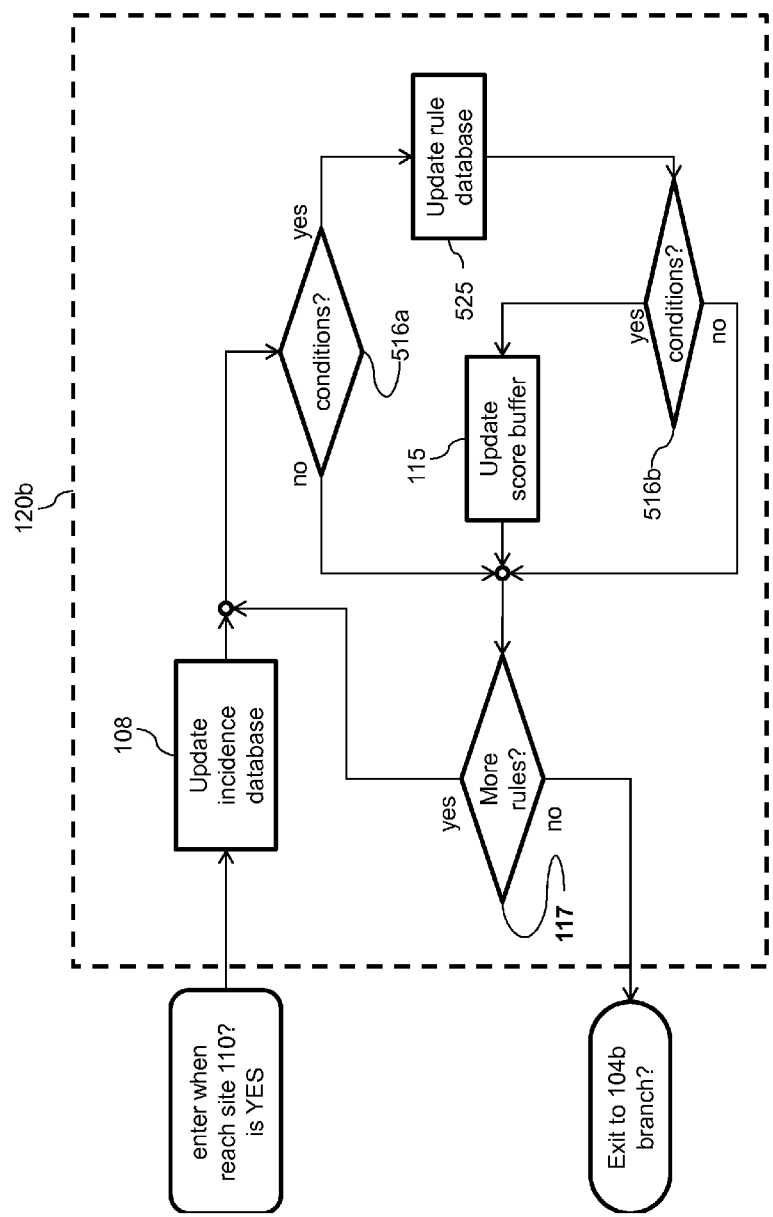
FIG. 5a is a flow chart illustrating overview of a second embodiment of a method for real-time content analysis.
Figure 5B:
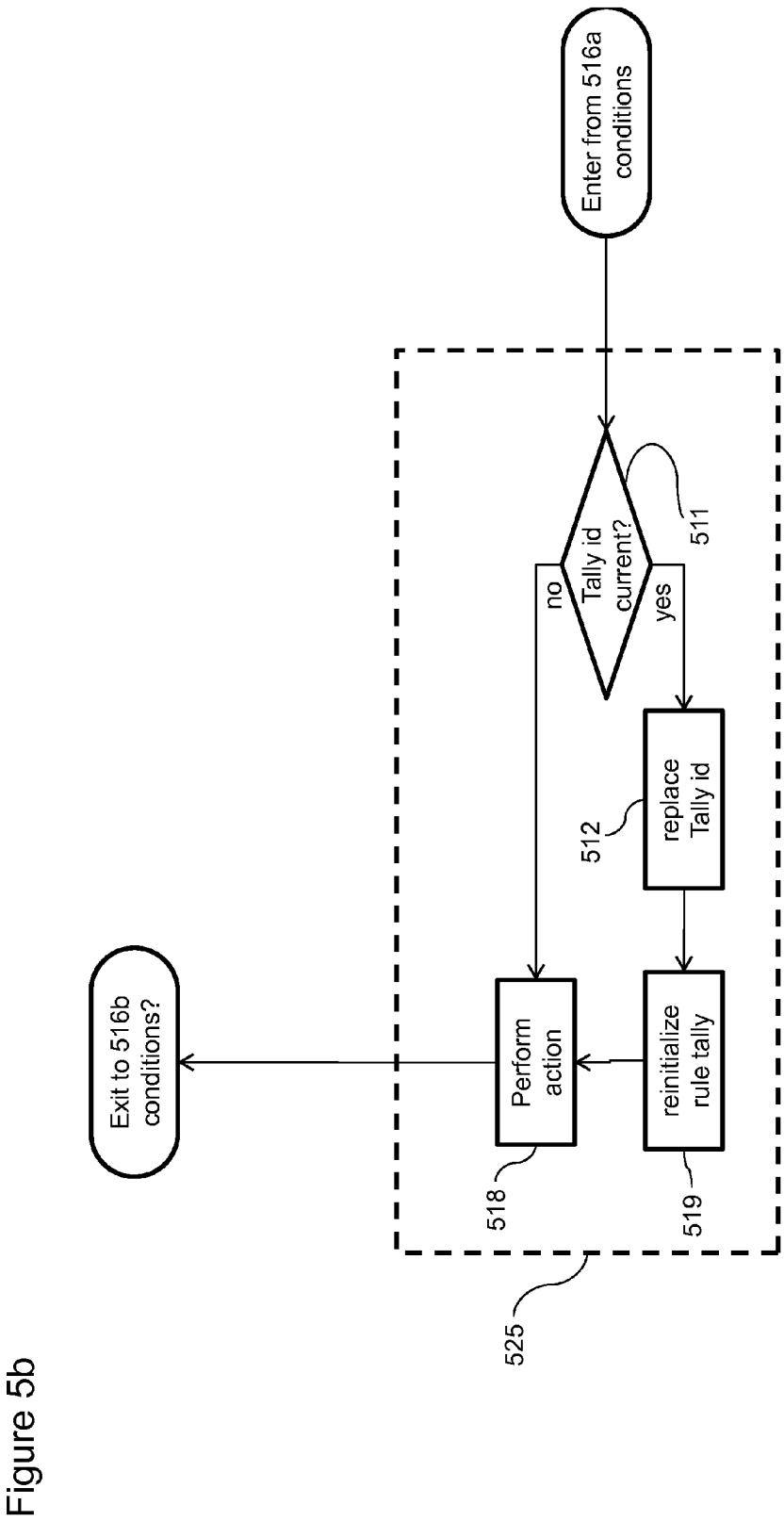
FIG. 5b is a flow chart illustrating a management of rule count database in a second embodiment of a real time text analysis system.

FIGS. 5*a*, 5*b* are flow charts illustrating a second embodiment of updating 120*b* score and incidence and rule databases for analyzing a text. In the second embodiment, the reading of the text and navigating of detection tree 200 are similar to the first embodiment illustrated in FIG. 2*a*. The high efficiency of the system of FIG. 5*a*-*b* allows a single computer to analyze a large number of texts simultaneously on-line. There is supplied one detection tree 200 (illustrated in FIG. 3) and one list of conditions 691 and one list of rules 692 (illustrated in FIG. 6*a*).

Figure 6A:
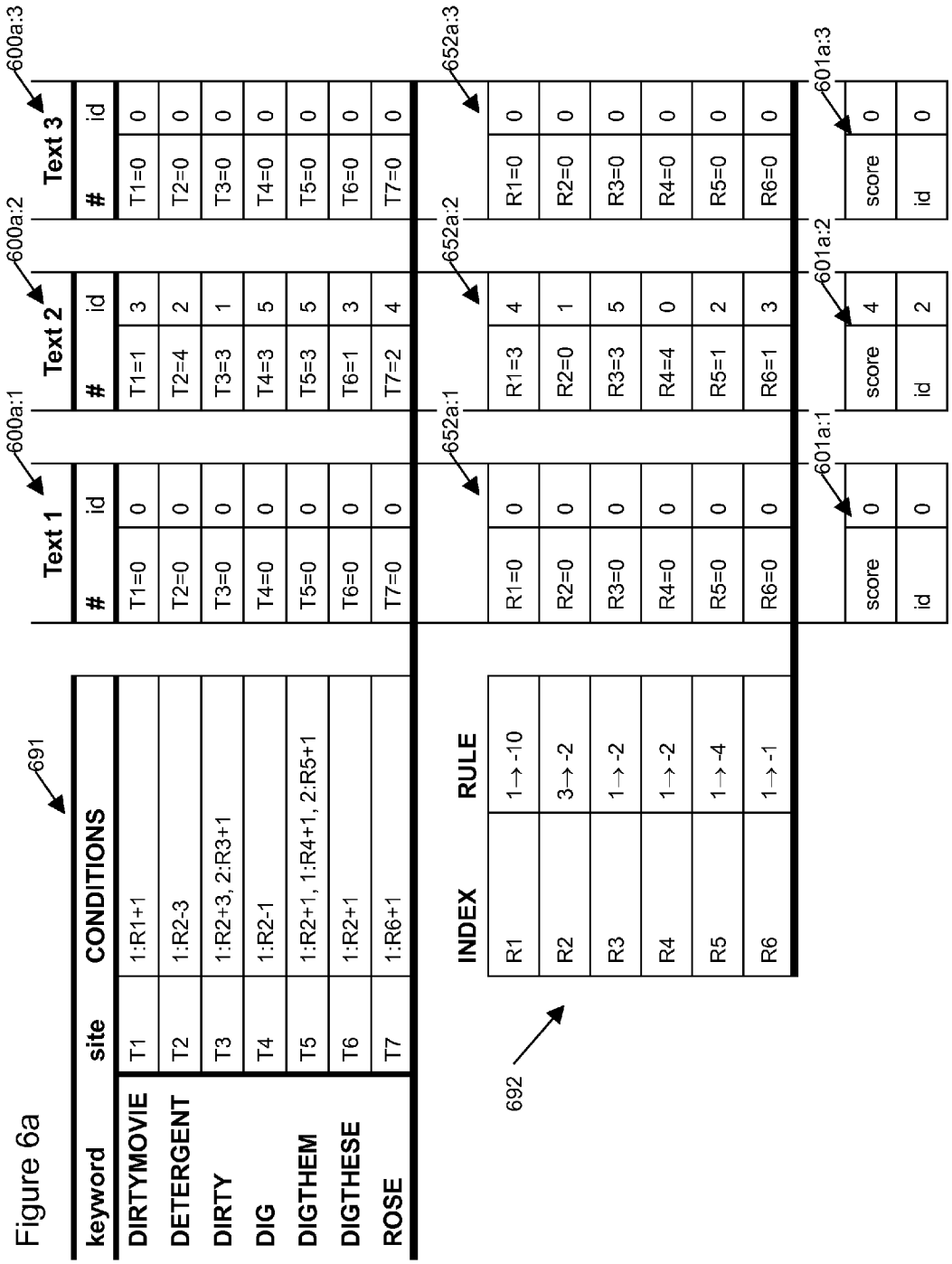
FIG. 6a is an illustration of a rule database and an incidence database for the second embodiment of a real-time text analysis system before analyzing a first and second text.

There are multiple sets of keyword incidence databases 600*a*:1, 600*a*:2, 600*a*:3, rule tally databases 652*a*:1, 652*a*:2, 652*a*:3, and score buffers 601*a*:1, 601*a*:2, 601*a*:3 (illustrated at different times in FIG. 6*a*, FIG. 6*b* and FIG. 6*c*). The system can analyze simultaneously multiple texts, one text for each independent set of keyword incidence database, rule tally database and score buffer. In the example of FIGS. 6*a*-*c* there are three independent sets of databases and therefore the system can analyze three texts simultaneously.

In the embodiment of FIG. 6*a*, keyword incidence databases 600*a*:1-3 are separate from rule tally databases 652*a*: 1-3. This arrangement allows efficient evaluation of the logical conditions as tallies without formally evaluating multiple conditional statements and without retrieving incidence counter values other than the current keyword. According to the description herein below, each condition of a list of conditions 691 and each rule of list of rules 692 of FIG. 6a is associated with a single conditional statement expressed as a limitation on a single rule tally counter value. Because each rule tally depends on many different keywords, the rule tally and score updating depend on multiple keyword counts. Thus, the embodiment of FIG. 5a achieves updating of the score conditional on multiple keyword counts without step 109 (retrieve counter values). One skilled in the art of computer programming will understand that when evaluating a large number of rules, this leads to a reduction of memory calls and conditional statement evaluations and saves significant time. Using the method of FIGS. 5a-b, a provider of safe Internet may simultaneously analyze thousands of pieces of text, each text being accessed by a different user.

Similarly to the system of FIGS. 4a-d, in the system of FIGS. 6a-c keyword incidence databases 600a:1-3, rule tally databases 652a:1-3 and score buffers 601a:1-3 do not need to start in a zero state and therefore do not need to be reset between texts. In the example, keyword incidence database 600a:1, rule tally database 652a:1 and score buffer 601a:1 are shown starting in a zero state for the first text and incidence database 600a:2, rule tally database 652a:2 and score buffer 601a:2 are shown starting in a non-zero state for a second text. A method of analyzing content will be illustrated herein, below where the first and second texts above will be analyzed simultaneously.

In the embodiment of FIGS. 5a-6c the first text is read and detection tree 200 is navigated. When the first keyword T3, "DIRTY," is read, detection tree 200 has been navigated to reach 110 site 235c, keyword T3, exactly as illustrated above in FIG. 2a of the first embodiment.

Upon reaching 110 site 235c keyword incidence database 600a:1 is updated 108 exactly as illustrated previously. Checking 111a the current scan id "1" is not equal to the previous encounter id of keyword T3 in keyword incidence database 600a:1, "0". Therefore, the incidence counter in the first column of the T3 row of keyword incidence database 600a:1 is reinitialized to zero 113 and then incremented 114 to "1" and the previous encounter id in the second column of the T3 row of keyword incidence database 600a:1 is replaced 112a with the current scan id, "1". The first condition of T3 is 1:R2+3, which means that on the first encounter "1:" of keyword T3, three is added "+3" to the tally of rule R2 in rule tally database 652a:1. Since the incidence counter of keyword T3 has been set to "1", therefore, the first condition of T3 (1:R2+3) is found 516a to be true and rule tally database 652a:1 is updated 525. It is emphasized that the condition for updating the rule tally is only on the incidence counter of the current keyword T3, nevertheless updating of score buffer 601:1 will depend on the rule tally counter value which depends on multiple keyword incidence counters (specifically R2 depends on T2, T3, T4, T5 and T6).

Details of updating 525 rule tally database 652a:1 are illustrated in FIG. 5b. The previous encounter id of rule R2 in rule tally database 652a:1 "0" is checked 511 and not equal to the current scan id "1". Therefore, the rule count for rule R2 is reinitialized 519 to zero and the rule tally encounter id is replaced 512 with the current scan id. Then, the rule tally is modified 518 by performing the action prescribed above in relation to keyword T3 (particularly 1:R2+3, adding 3 to the rule tally) making the tally of rule R2 3.

According to list of rules 692, rule R2 is 3→>−2 which means that when tally R2 attains the value 3 (that is to say, rises from below 3 and attains the value 3) subtract 2 from the score of the corresponding score buffer [note in the embodiment of FIGS. 5a-c, each rule implies its own converse, for example when the tally of R2 is reduced from 3 or greater to 2 or less, 2 is added to the corresponding score]. Since the tally of R2 of rule incidence database 600a:1 has now attained 3, the condition is found 516b true and score buffer 601a:1 is updated 115. It is emphasized that the condition for rule R2 is expressed as a limitation only on the tally of rule R2.

Updating 115 score buffer 601a is similar to updating score buffer 301a as described herein, above. Particularly, the score id "0" is checked 111b and found to not be equal to the current scan id "1". Therefore, the score is reinitialized 119 to zero and then 2 is subtracted according to rule R2, above giving a current score of −2. The state of keyword incidence database 600b:1, rule tally database 601b:1 and score buffer 601b:1 after reading keyword T3 are shown in FIG. 5b.

There remains 117 a second rule associated with keyword T3. The condition of the second rule of keyword T3 is 2:R3+1, which means that on the second encounter of keyword T3, 1 is added to the tally of rule R3 in rule tally database 652a:1. Since the incidence counter value of keyword T3 is 1<2, then the second condition of T3 (2:R3+1) is found 516a false.

Simultaneously, the system of FIG. 5a analyzes the second text above using keyword incidence database 600a:2, rule tally database 652a:2 and score buffer 601a:2. Reading the second text, the first keyword encountered is T4 "DIG" and detection tree 200 is navigated to reach 110 site 235d. Therefore, keyword incidence database 600a:2 is updated 108. In keyword incidence database 600a:2 the count of T3 is "3" and the previous encounter id is "5". In the current example, the current scan id of the second text is "8". The previous encounter id "5" is checked 111a and does not equal the current scan id "8". Therefore, the counter is reinitialized to zero 113 and the previous encounter id is replaced 112a with the current scan id "8". Then the incidence counter is incremented 114 to "1".

The condition of keyword T4 is 1:R2−1 (in words, when the incidence counter of T4 attains 1 (that is to say goes from less than one and reaches or surpasses ones), subtract 1 from the tally of rule R2 in the corresponding score buffer [and conversely when the tally is reduced from 1 or greater to 0 or less, then add 1 to the corresponding score buffer]). Since the keyword incidence counter for T4 in keyword incidence database 600a:2 is now "1", therefore the condition is found 516a true and rule tally database 652a:2 is updated 525. Particularly, the previous rule encounter id of R2 in rule tally database 652a:2 is checked 511 and found to be "1" which is not equal to the current scan id "8", therefore, the rule tally is reinitialized 519 to zero and the previous rule encounter id is replaced 512 with the current scan id "8". The rule tally is modified 518 by performing the action prescribed for T4 (subtract 1 from the tally of R2) leaving the tally equal to "−1".

The rule of R2 is 3→>−2 (rule R2 and its converse are explained above). Since the tally did not attain 3, the condition is found 516b false and the score buffer 601a:2 is not changed. The result of updating keyword incidence database 600a:2, rule tally database 652a:2 and score buffer 601a:2 after encountering keyword T4 is shown in keyword incidence database 600b:2, rule tally database 652b:2 and score buffer 601b:2 of FIG. 5b.

Continuing to read the first text and navigate detection tree 200, the keyword T4 "DIG" is found and site 235*d* is reached 110. Accordingly, keyword incidence database 600*b*:1 is updated 108 and the conditions corresponding to rule 1:R2−1 are found 516*a* true. According to principles already explained, rule tally database 652*b*:1 is updated 525, the rule tally for rule R2 is reduced from "3" to "2". The tally of rule R2 has been reduced from "3" to less than "3" which is the converse of the rule 3→>−2. Therefore the score is modified 518 by performing the converse action (particularly, two is added to score buffer 601*b*:1).

Continuing reading both texts to the end, according to principles already explained, results in keyword incidence database 600*c*:1-3, rule count databases 652*b*: 1-3 and score buffers 601*c*:1-3. Particularly, the final scores for the first and second texts −1 and −14 are exactly the same as those from the first embodiment (scores 342*c* and 342*d*). Thus, the method and system of the second embodiment (FIGS. 4*a,b* and 5*a-c*) achieves the same results as the first embodiment (FIGS. 2*a-c* and 4*a-d*). The advantage of the method of the second embodiment is that all conditions are explicitly dependent only on the count of the current keyword and rule. Therefore, it is not necessary to retrieve counts of other keywords or rules or to evaluate complex logical expressions.

In the spirit of the second embodiment many logical constructs can be built of FIGS. 5*a,b* and 6*a-c*. For example, it is possible to have a rule that depends on the absence of a keyword. For example, if the rule is "add five to the score if the keyword 'PICTURE' does not occur in the text", then score would be initialized at five and the word "PICTURE" would be a keyword e.g., T8. The condition on keyword T8 would be 1:R7+1 (when the word "PICTURE" is found add one to the count of rule R7) then rule R7 would be 1→>−5 (when the count of R7 attains [reaches or surpasses] 1, subtract 5 from the score).

In some cases it may be advantageous to string together a group of simple rules in order to form a compound rule. For example FIG. 7*a* illustrates a system having a list of conditions 791*a* with seven keywords and a list of rules 792*a* with four rules. The symbols are the same as in previous embodiments. Each list of conditions 791*a,b* is associated with an incidence database as in previous embodiments. Similarly, each list of rules 792*a,b* is associated with a rule tally database as in previous embodiments. Similarly list of intermediate rules 793 is associated with an intermediate rule tally database. For simplicity of description the incidence database, rule tally database and intermediate rule tally database are not illustrated in FIGS. 7*a,b*. Nevertheless, the functioning of the databases is similar to and understood from the previous embodiments.

In the example of FIG. 7*a*, when the incidence counter of keyword T1 or T2 or T3 surpasses one, the rule counters of rules R1, R2, and R3 are all incremented by one. When the incidence counter of T4 surpasses one the rule counter of R1 is incremented by one. When the incidence counter of T5 surpasses one the rule counter of R2 is incremented by one. When the incidence counter of T6 surpasses one the rule counter of R3 is incremented by one. When the incidence counter of T7 surpasses one the rule counter of R4 is incremented by one. Corresponding actions are taken when the rule counter R1 surpasses 4, R2 surpasses 4, R3 surpasses 4 or R4 surpasses 1. It is understood that according to the above, each time the keyword of T1, T2 or T3 is detected, three conditions must be checked. Furthermore, when the incidence counter of T1, T2, or T3 surpasses 1, three rule counters must be modified. The final result is that when the incidence counters of T1, T2, T3 and T4 are all one, then the action of R1 is performed, when the incidence counters of T1, T2, T3 and T5 are all one, then the action of R2 is performed, when the incidence counters of T1, T2, T3 and T6 are all one, then the action of R3 is performed, and when the incidence counter of T7 is one, then the action of R4 is performed.

The list of rules 792*b* of FIG. 7*b* achieves the same final result as list of rules 792*a* of FIG. 7*a*. Nevertheless, list of conditions 791*b* is much simpler than list of conditions 791*a*. Particularly, upon detecting each keyword only one condition is checked and one rule counter is modified according to intermediate rule list 793. Only when the full condition that T1, T2, and T3 are all one does intermediate rule list 793 call for updating multiple tallies of list of rules 792*b*. Thus, the embodiment of FIG. 7*b* achieves the same end as the embodiment of FIG. 7*a* with fewer conditional computations and fewer memory writes. It will be understood by one skilled in the art that the embodiment of FIG. 7*b* runs faster than the embodiment of FIG. 7*a*.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for analyzing of a plurality of texts, the system comprising:
   A) a plurality of keywords stored in a non-transitory computer readable structure, each keyword of said plurality of keywords stored as a respective site of a plurality of sites, said structure including a plurality of branches, each branch having plurality of sub branches, a unique ordered combination of a branch and one or more sub branches leading to each said respective site; each branch of said plurality of branches and each sub branch of said plurality of sub branches being associated with one respective character string, each said keyword being the ordered combination of respective character strings associated with the unique ordered combination of branch and sub branches leading to said respective site and each branch of said plurality of branches being included in more than one said unique combination of a branch and one or more sub branches leading to more than one respective site;
   B) a plurality of databases including a respective database corresponding to each text of the plurality of texts; each said respective database including a plurality of counters including a respective incidence corresponding to each of said plurality of keywords;
   C) a computer configured for said analyzing text of said plurality of texts including
      a) reading a current character string from said one text starting at a start character and selecting from said plurality of branches a current branch associated with said character string, b) recursively navigating said structure according to said one text subsequent to said first character string; said recursively navigating including,
   i) further reading from said one text a sequential character string sequential to said current character string,
   ii) selecting from a plurality of sub branches of said current branch, a next branch associated with said sequential character string and
   iii) replacing said current character string with said sequential character string and replacing said current branch with said next branch and repeating said further reading and said selecting and said replacing until a current branch leads to an encountered site of said plurality of sites,
c) incrementing in said respective database of said one text said respective incidence counter of a keyword when said keyword is found in said text starting at said start character by incrementing in said respective database of said one text said respective incidence counter of a keyword stored as said encountered site,
e) designating a new start character in the one text and repeating said reading, said navigating, said incrementing and
f) repeating said designating until for each of said plurality of keywords, said respective incidence counter indicates the number of times that said keyword appears in the one text;
D) a plurality of score buffers including at least one respective score buffer for each said text; each said score buffer storing a computer modifiable value; and wherein said computer is further configured for updating said value stored in a respective score buffer for said one text dependent on a limitation on a value of said respective incidence counter of at least two of said plurality of keywords
E) a rule counter and wherein said computer is further configured to set a value said rule counter dependent on at least two of said incidence counters, and wherein said updating is dependent on a value of said of rule counter.

2. The system of claim 1, wherein each character of said one text is designated as a start character at most once.

3. The system of claim 2, wherein each said respective database further includes an associated scan counter storing a scan id indicating whether said incidence counter was incremented during a current scan.

4. The system of claim 3, wherein said incrementing of said incidence counter further includes updating said scan id associated with said respective scan counter to a scan id of said one text, said computer further configured for:
   f) further navigating said structure according to another text with another scan id subsequent to the analyzing of the one text and wherein during said further navigating said incrementing includes zeroing said respective incidence counter when a stored scan id associated with said incidence counter does not equal said another scan id and wherein said incrementing said incidence counter of said further navigating includes updating said stored scan id associated said respective scan counter to said another scan id.

5. The system of claim 1, further wherein said computer is further configured for simultaneously analyzing another text of said plurality of texts.

6. The system of claim 1, further including
a lookup table configured for looking up at least two letters of the text simultaneously during said navigating.

7. The system of claim 1, further comprising
a further sub-branch of said current branch leading to said encountered site and wherein said recursively navigating, continues with said further sub branch as said current branch.

8. The system of claim 7, further comprising:
further reading at least one even more character from the text subsequent to said incrementing, and
selecting a further sub-branch of said encountered site, said further sub-branch matching said at least one even more character.

9. The system of claim 1, wherein said computer is configured to perform said updating only when a value of said respective incidence counter of a second keyword in said respective database of said one text is less than a threshold value.

10. The system of claim 9, wherein said threshold value is one.

* * * * *